United States Patent [19]
Nakano

[11] Patent Number: 5,662,752
[45] Date of Patent: Sep. 2, 1997

[54] PNEUMATIC TIRES WITH CENTRALLY PROTRUDING INCLINED BELT LAYER

[75] Inventor: Tatsuo Nakano, Tokyo, Japan

[73] Assignee: Bridgestone Corporation, Tokyo, Japan

[21] Appl. No.: 572,489

[22] Filed: Dec. 14, 1995

[30] Foreign Application Priority Data

Dec. 27, 1994 [JP] Japan .................... 6-325458

[51] Int. Cl.⁶ .................... B60C 9/18; B60C 9/20; B60C 9/28
[52] U.S. Cl. .................... 152/531; 152/526; 152/527; 152/538
[58] Field of Search .................... 152/538, 526, 152/531–532, 527

[56] References Cited

U.S. PATENT DOCUMENTS 4,883,108  11/1989  Takahashi et al. .
5,004,031   4/1991  Kadota et al. .

FOREIGN PATENT DOCUMENTS

| 0 425 318 | 5/1991 | European Pat. Off. . |
| 60-22504 | 2/1985 | Japan . |
| 292703 | 4/1990 | Japan . |
| 292704 | 4/1990 | Japan . |
| 5-58113 | 3/1993 | Japan .................... 152/538 |
| 6219106 | 8/1994 | Japan .................... 152/538 |

*Primary Examiner*—Adrienne C. Johnstone
*Attorney, Agent, or Firm*—Sughrue, Mion, Zinn, Macpeak & Seas

[57] ABSTRACT

A pneumatic tire comprising a belt and a tread disposed radially outside of a toroidal carcass extending between a pair of beads, wherein the belt comprises at least one circumferential belt layer having rubber coated reinforcing elements extending substantially along the circumferential direction of the tire and at least one inclined belt layer having rubber coated reinforcing elements extending at an angle with respect to the tire equatorial plane, wherein at least one said inclined belt layer is protruded radially outwardly at the center portion in the widthwise direction of the belt with respect to its both side portions.

8 Claims, 4 Drawing Sheets

PNEUMATIC TIRES WITH CENTRALLY PROTRUDING INCLINED BELT LAYER

BACKGROUND OF THE INVENTION

1. Field of the Invention

This invention relates to pneumatic tires, especially to tires where a carcass is reinforced by a circumferential belt layer comprising reinforcing elements extending in straight, waved, or zigzag manner substantially along the tire circumference.

2. Description of the Prior Art

There are known many ways of strengthening circumferential rigidity of a belt in pneumatic tires by adding a circumferential belt layer to the conventional inclined belt layer having reinforcing elements extending at an angle with respect to the equatorial plane of the tire.

For example, Japanese Patent Laid Open No. 60-22504 discloses a tire having the circumferential belt layer comprising reinforcing elements having a Young's modulus of not less than 2500 kgf/mm$^2$ whereby the circumferential rigidity is enhanced and separation failure at the belt ends is prevented.

Since the elements of the circumferential belt layer are disposed substantially along the circumferential direction of the tire, the elements are tensioned and lengthened in the circumferential direction in the ground contacting area. In particular, since the diameter of both tread side portions is less than that of the tread center portion, the diameter of both tread side portions is necessarily expanded, so that the reinforcing elements are considerably lengthened. That is, since the reinforcing elements at the side end portions of the circumferential belt layer are lengthened repeatedly in the circumferential direction during rotation of the tire, the reinforcing elements are apt to be broken at the side end portions of the circumferential belt layer. This is a disadvantage of a belt provided with a circumferential belt layer.

An object of the present invention is to prevent the disadvantage caused by providing a circumferential belt layer, in particular breaking of the elements at the edge portions of the circumferential belt layer, and to provide a pneumatic tire having strengthened circumferential rigidity.

SUMMARY OF THE INVENTION

The present invention provides a pneumatic tire comprising a belt and a tread disposed radially outside of a toroidal carcass extending between a pair of beads, wherein the belt comprises at least one circumferential belt layer having rubber coated reinforcing elements extending substantially along the circumferential direction of the tire and at least one included belt layer having rubber coated reinforcing elements extending at an angle with respect to the tire equatorial plane, and wherein at least one said inclined belt layer protrudes radially outwardly at the center portion in the widthwise direction of the belt with respect to both its side portions.

In one preferred embodiment of the invention, the circumferential belt layer(s) are disposed on both side portions of the inclined belt layer(s) except for the center portion in the widthwise direction.

In another preferred embodiment of the invention, the belt includes at least two circumferential belt layers, and at least one radially inner circumferential belt layer is disposed on both side portions of the inclined belt layer(s) except for the center portion in the widthwise direction while at least one radially outer circumferential belt layer is disposed continuously along the widthwise direction.

The reinforcing elements of the circumferential belt layer can be a waved-shaped or zigzag-shaped cord or monofilament as well as a conventional straight cord or monofilament that is disposed in the circumferential direction, and can be a spirally wound ribbon comprising a plurality of cords or monofilaments coated with rubber.

DESCRIPTION OF THE PREFERRED EMBODIMENTS

Figure 1:
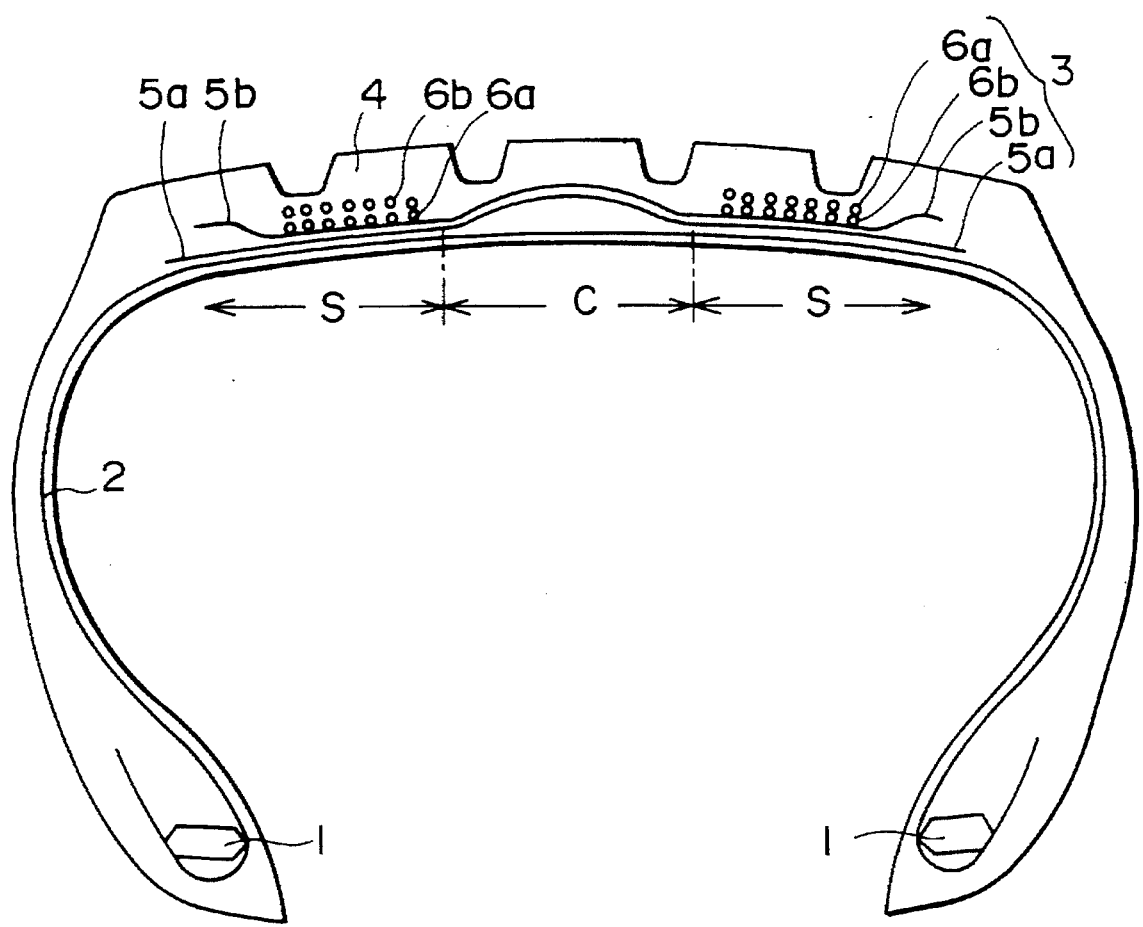
FIG. 1 is a widthwise cross-section of a pneumatic tire according to this invention.

FIG. 1 is a cross-section of a typical tire according to this invention. This pneumatic tire comprises a carcass 2 extending between a pair of beads 1, a belt 3 comprising at least one slant belt layer 5a, 5b and at least one circumferential belt layer 6a, 6b, and a tread 4.

In this particular embodiment, the belt 3 consists of two inclined belt layers 5a, 5b disposed outside of the carcass 2 and two circumferential belt layers 6a, 6b disposed on both side portions of the inclined belt layers except for the center portion in the widthwise direction.

The inclined belt layers 5a, 5b are disposed such that the center portion C in the widthwise direction is projected radially outwards with respect to the remaining side portions S thereof. In other words, the diameter of the inclined belt layers varies in the widthwise direction such that the diameter of the center portion C is larger than that of an imaginary line connecting both side portions S.

The center portion C of the inclined belt layers is a region that extends from the mid-equatorial plane of the tire toward each side by 10–40% of the maximum width of the inclined belt layers, and a part or the entirety of this center portion is disposed outside of the side portions S. In this embodiment, two inclined belt layers are thus projected radially outwardly at the center portion, but according to the invention only one such inclined belt layer can be thus projected.

Figure 2:
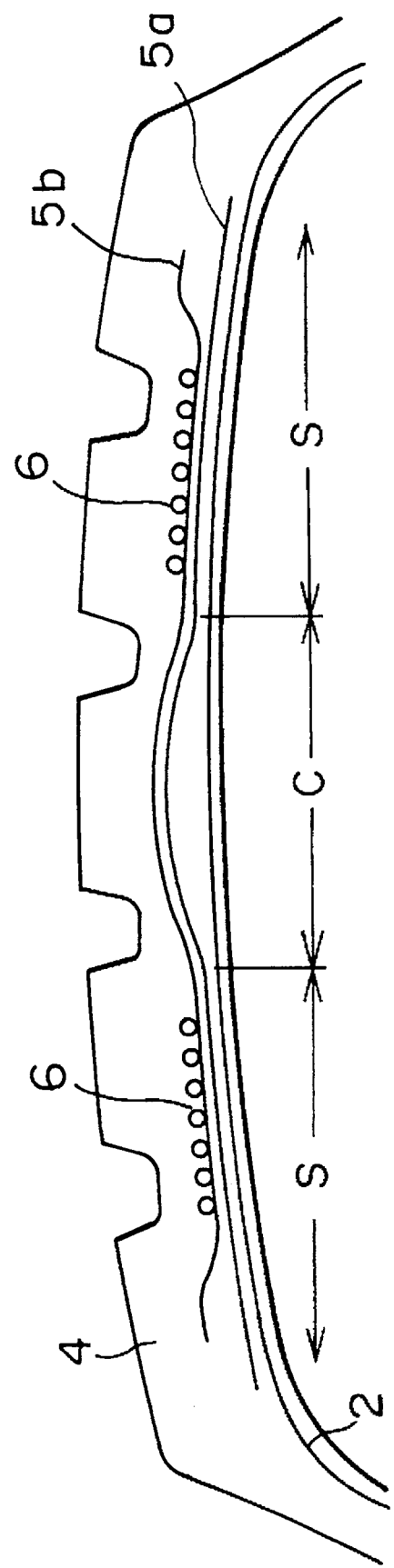
FIG. 2 is an enlarged cross-section of a belt structure according to this invention.
Figure 3:
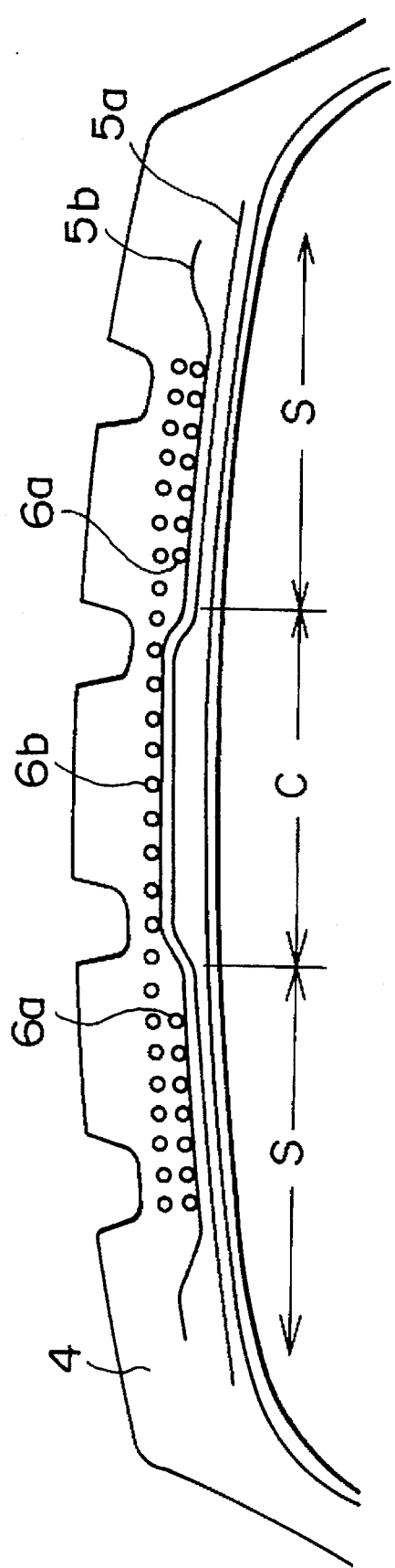
FIG. 3 is an enlarged cross-section of another belt structure according to this invention.

The belt 3 is not limited to the structure as shown in FIG. 1 and may have a structure as shown in FIG. 2 or FIG. 3.

FIG. 2 shows a belt consisting of a single circumferential belt layer 6 disposed on the side portions S of the slant belt layers 5a, 5b.

FIG. 3 shows a belt consisting of inclined belt layers 5a, 5b protruding outwards in the radial direction at the center portion C, and circumferential belt layers 6a, 6b in which the radially outer layer 6b is disposed continuously along the widthwise direction.

Since the breaking of the reinforcing elements occurring at the side end portions of the circumferential belt layer is due to the fact that the elements suffer repeated large stretching during tire rotation, it is effective for enhancing the durability to prevent breaking of the reinforcing elements to restrain the stretching concentrated at the side end portions of the circumferential belt layer.

Thus, the inventor has studied means for relaxing the tension at the side end portions of the circumferential belt layer because the concentration of the tension at the side end portions of the circumferential belt layer causes stretching of the reinforcing elements at such portions. That is, the inventor carried out investigations based on the idea that, when the belt extending in the circumferential direction is considered as a beam, it is possible to relax the stretch concentrating at the reinforcing elements of the circumferential belt layer at the side end portions by changing the position of the neutral axis where neither stretch nor compression arises in lateral cross-section (cross-section in the widthwise direction of the tire). In particular, when the position of the neutral axis is shifted radially outside toward the circumferential belt layer, the stretching of the circumferential belt layer is made small.

Specifically, in order to change the position of the neutral axis in the widthwise cross-section of the belt, the shape of the belt layer in the widthwise cross-section, which was considered as a beam, was studied. On the one hand, it is difficult to change the shape of the circumferential belt layer, because the circumferential belt layer is given a constraint such that the circumferential belt layer has a hooping effect function and a certain spacing between the circumferential belt layer and the bottom of a groove in the tread needs to be retained. On the other hand, it is easier to change the shape of the inclined belt because of comparatively less constraint. Further, for truck or bus tires in which steel cords are usually used as reinforcing elements of the circumferential belt layer, it is effective in respect of reducing the weight of the tire to place the circumferential belt layer only at the portion necessary for the hooping effect, that is only on both side portions. Therefore the shape of the center portion of the inclined belt layer where there is no circumferential belt layer thereon can be easily changed.

When the inclined belt layer was projected radially outwardly at the center portion and the stretch amount of the reinforcing elements at the end portions of the circumferential belt layer was measured, it was found that the stretching of the elements was much less than that of unchanged inclined belt.

When at least a part or the whole of the center portion C of the inclined belt layer is disposed radially outwardly with respect to the side portions S, the above-mentioned effect of restraining the stretching of the reinforcing elements can be obtained. Furthermore, it is more effective that the center portion C is disposed to be protruded with respect to the side portions S in the radial direction by a distance equal to or larger than the diameter of the reinforcing elements of the inclined belt layer.

The belt structure of the embodiment shown in FIG. 3 has the advantage of avoiding the breaking of the reinforcing elements because the number of the reinforcing elements of steel cords in the circumferential belt layers is larger than that of the tire shown in FIG. 1 or FIG. 2. One circumferential belt layer continuously extends in the widthwise direction of the belt, although this structure is disadvantageous with respect to reducing the tire weight.

This embodiment is based on an idea that it is possible to largely transfer the neutral axis of the belt toward the tread by disposing the circumferential belt layer having much larger circumferential rigidity than the inclined belt layer radially outside (in the tread) of the projected center portion of the inclined belt layer as well as by projecting the inclined belt layer. An experiment with respect to measurement of the belt stretching and a running test on a drum showed that this idea is correct. On the other hand, the weight of the tire increases, resulting in the disadvantage of degrading rolling resistance and so on. Therefore, the belt structure of this embodiment is useful for enhancing durability of the belt under circumstances wherein increasing the weight of the tire is permitted.

Pneumatic radial tires according to this invention (Invention tires 1, 2, 3) having a size of 11/70 R22.5 for trucks and buses and having belt structures according to FIGS. 1, 2 and 3 respectively were manufactured. In each tire, the circumferential belt layer comprises wave-shaped (wave length: 36.6 mm, amplitude: 1.3 mm) steel cords having a structure of 3+9×0.19 mm (0.8 mmφ) at a density of 28 ends/50 mm, and the inclined belt layer comprises steel cords having a structure of 3+9+15×0.23 mm (1.4 mm φ) and disposed at an angle of 18° with respect to the equatorial plane at a density of 23 ends/50 mm. The width of the center portion C of the inclined belt layer is 70 mm and the width of the side portions S is also 70 mm. The entire center portion C is projected with respect to both side portions S by a distance in the radial direction of 3.0 mm in the tire of FIG. 1, 1.5 mm in the tire of FIG. 2, and 1.5 mm in the tire of FIG. 3.

Figure 4:
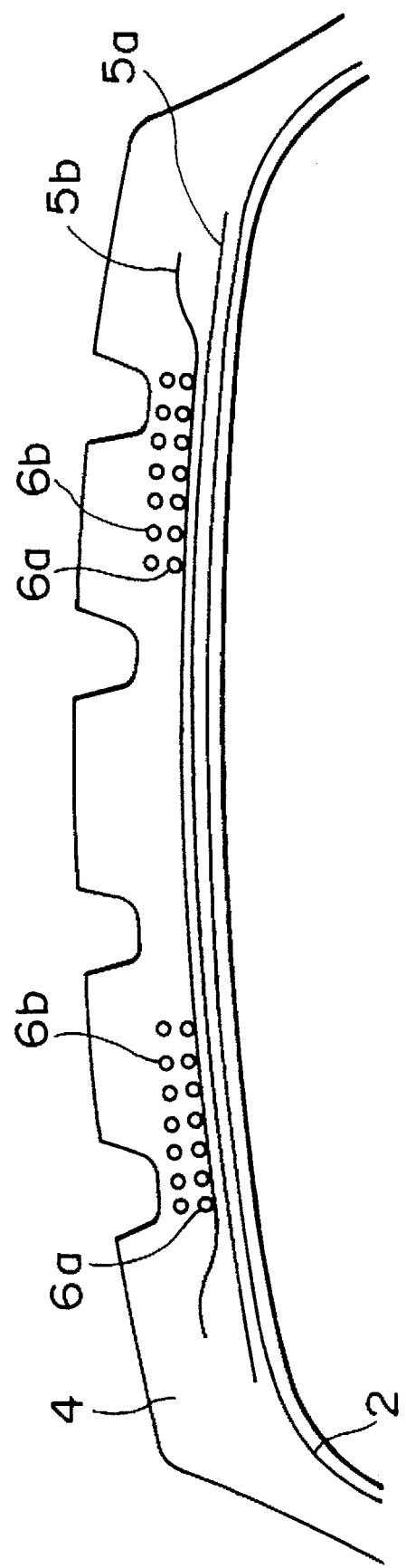
FIG. 4 is a cross-section of a conventional belt structure.

A comparable tire having a conventional belt structure as shown in FIG. 4 and having the same size was also manufactured.

Drum tests on these tires inflated with regulated pressure of 8.0 kgf/cm² were made over a distance of 50,000 km under 130% load and 50 km/h, and then ⅓ of the whole circumference of the tire was dissected and the total number of broken filaments of the cords in the circumferential belt layer was measured. Table 1 shows the results obtained together with the weight of the tires by index in comparison with the comparable tire (FIG. 4) as 100 (control).

TABLE 1

| Tire | | Number of broken cords | Weight of tire |
| --- | --- | --- | --- |
| Comparable tire | FIG. 4 | 43 | 100 |
| Invention tire 1 | FIG. 1 | 0 | 100 |
| Invention tire 2 | FIG. 2 | 2 | 97 |
| Invention tire 3 | FIG. 3 | 0 | 104 |

According to this invention, high performance tires can be obtained because the circumferential rigidity can be enhanced by adding a circumferential belt layer without occurrence of breaking of reinforcing elements in the side end portions of the belt layer.

While the invention has been particularly shown and described with reference to certain preferred embodiments thereof, it will be understood by those skilled in the art that various changes and modifications may be made without departing from the spirit and scope of the invention.

I claim:

1. A pneumatic tire comprising; a belt and a tread disposed radially outside of a toroidal carcass extending between a pair of beads, the belt comprises at least one circumferential belt layer having rubber coated reinforcing elements extending substantially along the circumferential direction of the tire and at least one inclined belt layer having rubber coated reinforcing elements extending at an angle with respect to the tire equatorial plane, wherein at least one said inclined belt layer protrudes radially outwardly at the center portion in the widthwise direction of the belt with respect to both its side portions, and wherein said at least one circumferential belt layer is disposed on both side portions of said at least one inclined belt layer except for the center portion in the widthwise direction.

2. The pneumatic tire according to claim 1, wherein the belt consists of two inclined belt layers disposed outside of the carcass and two circumferential belt layers disposed on both side portions of the inclined belt layers except for the center portion in the widthwise direction, and wherein both said inclined belt layers are, protrude radially outwardly at the center portion in the widthwise direction of the belt with respect to both its side portions.

3. The pneumatic tire according to claim 1, wherein the belt consists of two inclined belt layers disposed outside of the carcass and a single circumferential belt layer disposed on both side portions of the inclined belt layers except for the center portion in the widthwise direction, and wherein both said inclined belt layers protrude radially outwardly at the center portion in the widthwise direction of the belt with respect to both its side portions.

4. The pneumatic tire according to claim 1, wherein the center portion protrudes with respect to the side portions in the radial direction by a distance not less than the diameter of the reinforcing elements of the inclined belt layer.

5. A pneumatic tire comprising; a belt and a tread disposed radially outside of a toroidal carcass extending between a pair of beads, the belt comprises at least one circumferential belt layer having rubber coated reinforcing elements extending substantially along the circumferential direction of the tire and at least one inclined belt layer having rubber coated reinforcing elements extending at an angle with respect to the tire equatorial plane, wherein at least one said inclined belt layer protrudes radially outwardly at the center portion in the widthwise direction of the belt with respect to both its side portions, and wherein the belt includes at least two circumferential belt layers, and at least one said radially inner circumferential belt layer is disposed on both side portions of said at least one inclined belt layer except for the center portion in the widthwise direction while at least one said radially outer, circumferential belt layer is disposed continuously along the widthwise direction.

6. The pneumatic tire according to claim 5, wherein the center portion protrudes with respect to the side portions in the radial direction by a distance not less than the diameter of the center portion protrudes with respect to the side portions in the reinforcing elements of the inclined belt layer.

7. A pneumatic tire comprising; a belt and a tread disposed radially outside of a toroidal carcass extending between a pair of beads, the belt comprises at least one circumferential belt layer having rubber coated reinforcing elements extending substantially along the circumferential direction of the tire and at least one inclined belt layer having rubber coated reinforcing elements extending at an angle with respect to the tire equatorial plane, wherein at least one said inclined belt layer protrudes radially outwardly at the center portion in the widthwise direction of the belt with respect to both its side portions, and wherein the belt consists of two inclined belt layers disposed outside of the carcass and two circumferential belt layers disposed on the inclined belt layers, wherein the radially inner circumferential belt layer is disposed on both side portions of the inclined belt layers except for the center portion in the widthwise direction while the radially outer circumferential belt layer is disposed continuously along the widthwise direction, and wherein both said inclined belt layers are protruded radially outwardly at the center portion in the widthwise direction of the belt with respect to both its side portions.

8. The pneumatic tire according to claim 7, wherein the center portion protrudes with respect to the side portions in the radial direction by a distance not less than the diameter of the reinforcing elements of the inclined belt layer.

* * * * *